July 17, 1934.　　　F. E. McCABE　　　1,966,899
PIPE HANGER
Filed Dec. 17, 1931
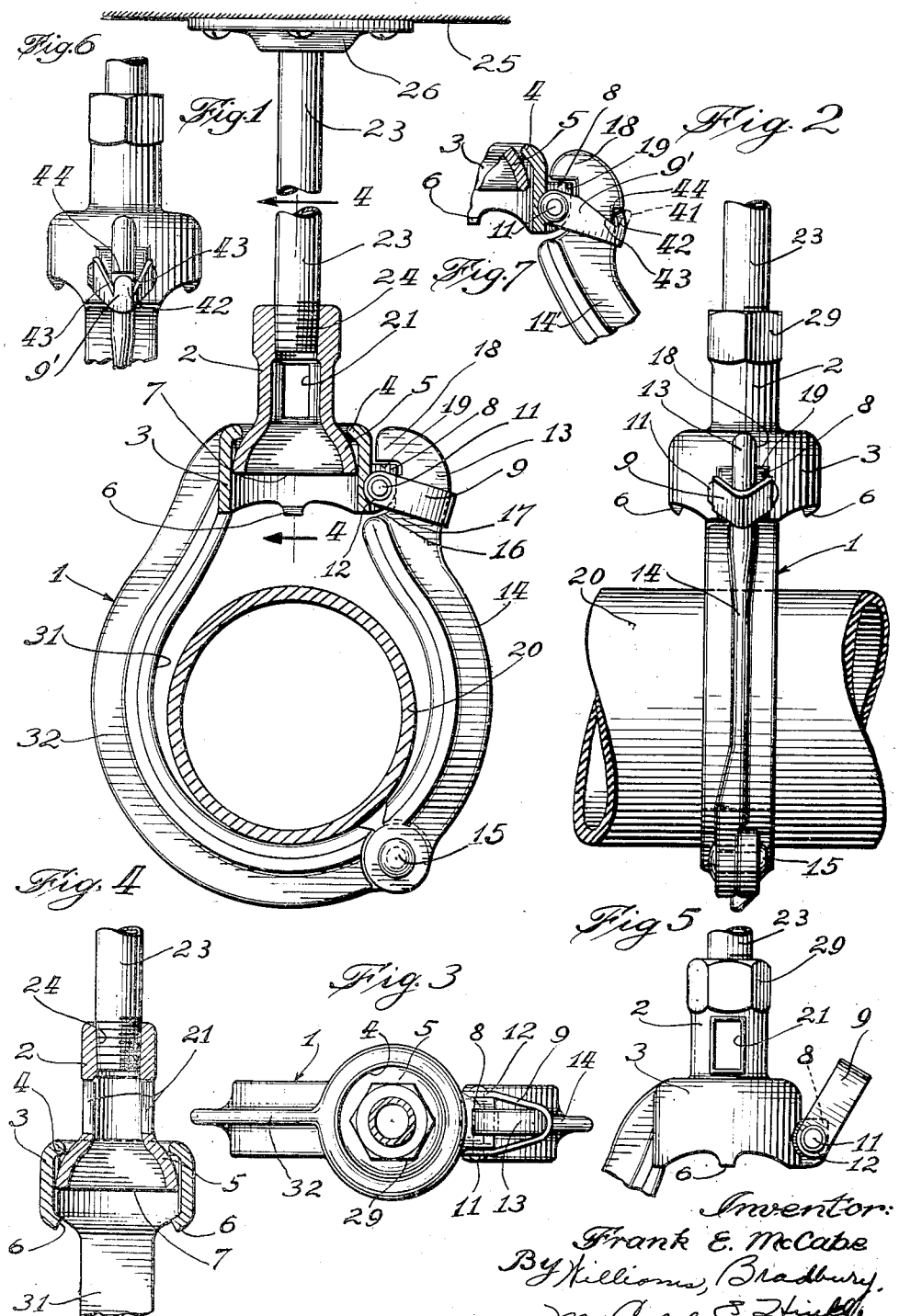
Inventor:
Frank E. McCabe
By Williams, Bradbury,
McCaleb & Hinkle
Attys.

Patented July 17, 1934

1,966,899

UNITED STATES PATENT OFFICE 1,966,899

PIPE HANGER

Frank E. McCabe, Shaker Heights, Ohio, assignor to The Grabler Manufacturing Company, Cleveland, Ohio, a corporation of Ohio Application December 17, 1931, Serial No. 581,646

3 Claims. (Cl. 248—31)

This invention relates to pipe hangers. The mechanism described in this specification is used primarily to suspend pipes or other elongated devices from a ceiling and is designed to support elongated members of circular cross section to be suspended in a substantially horizontal position.

An object of this invention is to provide a pipe hanger which, by means of a flexible joint between the main support and the pipe supporting member will allow a limited movement of the pipe in either a longitudinal or lateral direction, without causing excess strain on either the pipe suspending member or the main supporting member.

Another object of this invention is to provide a hanger which has a lateral outlet and a closing member for this outlet, so that the pipe to be suspended can be easily placed within the encircling arms of the hanger.

Another object of this invention is to provide means whereby the hinged arm of the hanger, which allows the lateral entrance of the pipe to the hanger, can be securely locked in position.

Other advantages and objectives of this invention will be apparent from the appended detailed description.

In the accompanying drawing:

Figure 1 is an elevation partly in section of the pipe hanger incorporating my invention;

Fig. 2 is a side elevation of a portion of the hanger shown in Fig. 1;

Fig. 3 is a plan view of the hanger shown in Fig. 2 with the supporting rod in section;

Fig. 4 is a fragmentary section taken on substantially the line 4—4 of Fig. 1;

Fig. 5 is an elevation of a fragment of the device shown in Fig. 2;

Fig. 6 is a side elevation of another embodiment of the clasp locking means, showing parts whereby the hanger can be permanently locked to prevent the removal of the pipe; and Fig. 7 is an elevation of Fig. 6 partly in section showing the same embodiment.

The pipe hanger of my invention in general comprises a supporting rod firmly fixed to a ceiling by means of a flange; a sleeve adjustably attached to the supporting rod; and a supporting loop for cradling the pipe to be suspended. In order to obtain the objectives set forth above, a flexible joint is provided between the supporting sleeve and the pipe holding loop; a hinged arm is provided in the supporting loop of the hanger which by a lateral movement will open the loop to allow entry for the pipe; and a locking means is provided to keep the supporting loop permanently clasped about the pipe.

The pipe 20 to be supported is cradled in a pear-shaped loop which has two branches, an encircling branch 1, and a locking branch 14. These two branches are firmly hinged together by a rivet 15 about which the two arms may move laterally with respect to each other. When they are in closed position they form the encompassing loop for the pipe 20 as mentioned before. On the upper end of the encircling branch 1 and integral therewith is formed a short cylinder 3 whose axis is normal to the axis of the supporting loop. This cylinder 3 has on its upper end an inwardly turned radial flange 4 whose beaded surface rides upon the arcuate surface of a semispherical skirt 5 on the supporting sleeve 2. This semi-spherical skirt forms the ball of the flexible joint between the pipe holding loop and the supporting sleeve, while the bead on the flange 4 forms a modified socket, and the interaction between these two surfaces allows the pipe a limited movement in either a lateral or longitudinal direction.

In order to attain this result, the internal diameter of the cylinder 3 must be slightly larger than the largest diameter of the skirt, yet the largest diameter of the skirt must be larger than the inside diameter of the inwardly extending flange 4. Furthermore, the diameter of the upper end of the skirt, where it joins integral with the supporting sleeve must be smaller than the internal diameter of the flange beads. This is vital, otherwise the bead will not ride properly upon the arcuate surface of the skirt to form a smoothly operating flexible joint. For the best results, the bead should ride midway on the skirt when the loop is in normal operating position with regard to sleeve 2.

This supporting sleeve 2 is attached to the supporting rod 23 by interlocking threads 24 which also allow adjustment between the rod and sleeve. The adjustment of the sleeve in turn controls the position of the pipe supporting loop. This adjustment is essential so that the operator can distribute the weight of the pipe equally between the various supporting hangers. To facilitate this adjustment, opposite holes 21 are provided to allow the operator to observe the exact position of the threaded relation between the supporting rod and the sleeve. These holes have a further use in applying the sleeve to the rod, because they can be used in lieu of a wrench for tightening or loosening the sleeve. To do this a rod or any stiff rigid member can be placed through the holes and by a force applied to the rod the sleeve can be turned. The sleeve 2 is provided with additional means to attain this turning movement by having a hexagonal section 29 positioned on the upper end of the sleeve. By applying a wrench to this section the sleeve can be turned with ease. The supporting rod 23 is attached to a ceiling 25 by means of the flange 26 or by any other suitable means.

The parts of the flexible joint are made separately and then assembled. This is done by introducing the sleeve 2 through the aperture in the cylinder, so as to bring the flaring skirt on the sleeve into operable contact with the bead on the cylinder. In order that these parts may remain in operable position and to prevent the two parts from becoming detached, an obstruction is placed on the lower end of the cylinder to come into contact with the lower edge 7 of the skirt 5. The obstruction is obtained by the nibs 6, which prior to the assembly are aligned with the cylinder walls, but after the sleeve is in operable position these nibs are hammered inwardly by a series of light blows to form the desired obstruction. In this way parts of the hanger are conveniently kept together in operable relation.

A lug 8 laterally disposed on the cylinder 3 fits into a recession 16 in the arm 14 to form the anchor for the hinged arm of the pipe supporting loop. This lug 8 is positioned on the cylinder 3 diametrically opposite from the location of the integral connection of the encircling arm 1 to the short cylinder 3, which is then symmetrically disposed in regard to both arms, to form the means whereby the downward pull of the pipe weight is uniformly distributed on the supporting sleeve. The hinged arm 14 conveys its pull to the cylinder 3 by the interaction between the lower side of the head 18 and the upper surface 19 of the lug 8. For successful operation of the hanger it is essential to keep these bearing surfaces in full contact and to prevent lateral movement outwardly of the arm 14. To attain this end a V-shaped stirrup 9 is supplied which encircles the head 18. The ends 12 of the stirrup 9 are flattened and made parallel so as to align with the side surfaces of the lug 8, to which it is fastened through registering holes in the stirrup ends and the lug by means of a rivet 11. The stirrup 9 is preferably made of spring material, which presses against the lug surfaces by the ends 12 so as to form a frictional joint. This hard action is assisted by the tight fitting rivet 11 which prevents easy movement of the stirrup either to engage or disengage the head 18.

In the operation of the hanger, the arm 14 is first lowered to a horizontal position, which allows the entry of the pipe 20 into the encircling arm 1. The stirrup 9 is put into the upward position as shown in Fig. 5, the friction between the holding surface of the stirrup and the lug 8 tending to hold it up. The arm 14 is then raised so that the head 18 is contiguous to the cylinder 3, and the lower surface of the head is in contact with the upper surface 19 of the lug 8. The stirrup 9 is then lowered into position over the head 18 as shown in Figs. 1 and 2, the friction tending to hold it in position. The arm 14 is then held in position against the cylinder 3 and cannot move outwardly.

Another embodiment of the locking means is shown in Figs. 6 and 7. The holding stirrup 9' has the same general shape as the one previously described. By means of the nib 42 formed on the upper side of the stirrup 9' by cutting away the adjacent sides as shown at 43, the arm 14' can be securely and permanently locked to the encircling part 1 when the nib 42 is hammered into engagement with the notch 44 on the arm 14'. The original position of this nib is shown in outline 41 in Fig. 7. The final position is also shown in detail in the same figure when it is in engagement with the cut away notch 44 on the arm 14'. In other respects the latch is similar to the one described before except that the former latch does not have this permanently locking feature.

In the operation of this holding device, the pipe 20 is first placed within the encircling arms 1 and 14' of the hanger. The upper end of the arm 14' is then brought into close engagement with the lug 8, the stirrup 9' being raised meanwhile to a position substantially similar to that shown in Fig. 5. When the upper end of the arm 14' and the lug 8 are contiguous, the stirrup 9' is lowered to encompass the head 18, until the nib 42 is below the cut away notch 44 on the arm 14'. Then with a hammer the nib 42 is forced inwardly by a series of light blows until it assumes a position in engagement with the cut away notch 44 as clearly shown in Fig. 7. From this it is clear that the holding stirrup 9' cannot move upwardly so as to release the contact between the arm 14' and the encircling member 1, but is held permanently in locked position.

The member 1 and arm 14 are of substantially T cross section, consisting of a flat-pipe-engaging flange 31 which is the bearing surface for the pipe 20, and the outwardly extending flange 32, which is a re-enforcing member to give the pipe-holding loop great strength with the use of a minimum of material. This construction gives maximum strength to the hanger with a minimum in weight.

It will be appreciated by those skilled in the art that certain changes and modifications may be made on these constructions herein disclosed and described without departing from the principle of the invention as set forth in the appended claims.

I claim as my invention:

1. In a device of the class described, a pipe holding member having an opening at one side for permitting lateral access of a pipe thereto, a hinged arm on said holding member for closing the opening, said holding member including a laterally extending lug engageable by said arm when in closed position, and an inwardly extending portion on said arm disposed to engage the top of said lug when said holding member is stressed by an article thereon, and means for locking said arm in closed position comprising, a doubled latch element, the ends of said element being pivotally secured to and having frictional engagement with said lug, the intermediate portion of said element forming a loop adapted to pass over and lock the upper end of said arm, when said arm is in engagement with said lug.

2. In a pipe hanger, a pipe holding member including a hook shaped holding portion and a coupling portion, an arm hinged to the free end of said hook portion and engageable with said coupling portion, means for locking said arm in place comprising a notch in said arm, a stirrup, a tongue on the stirrup in engagement with said notch, said stirrup being attached to said coupling portion, a supporting member including a terminal portion extending into said coupling portion to form a swivel joint therewith, and means on said coupling portion to prevent the removal of said terminal portion.

3. In a pipe hanger, a pipe holding member including a hook shaped holding portion and a coupling portion, an arm hinged to the free end of said hook portion and engageable with said coupling portion, means for locking said arm in place, comprising a notch in said arm, a stirrup attached to said coupling portion with a malleable nib in engagement with said notch, a supporting member for said holding member, said supporting member comprising an expanded bell-shaped terminal portion extending into the coupling portion and an in-turned flange on said coupling portion engageable with said terminal portion to prevent the withdrawal thereof.

FRANK E. McCABE.